UNITED STATES PATENT OFFICE.

JEAN ALTWEGG, OF LYON, FRANCE, ASSIGNOR TO SOCIETE CHIMIQUE DES USINES DU RHONE, OF PARIS, FRANCE.

PROCESS FOR THE PRODUCTION OF ORGANIC SILVER ALCOSOLS.

1,413,151.    Specification of Letters Patent.    Patented Apr. 18, 1922.

No Drawing.    Application filed July 2, 1921. Serial No. 482,177.

*To all whom it may concern:*

Be it known that I, JEAN ALTWEGG, residing at 227 bis Avenue de Saxe, Lyon, France, a citizen of the Confederation of Switzerland, have invented certain new and useful Improvements in Processes for the Production of Organic Silver Alcosols.

It is known that weak alcoholic solutions of silver can be produced electrically for example by means of oscillating discharges. Moreover E. A. Schneider (Ber. Deutsche Chem. Gesellsch., vol. 25, p. 1166 of 1892) obtained silver alcosols by several months of dialysis of silver hydrosols using absolute alcohol, or by filtering a hydrosol precipitated with alcohol on unglazed clay with exact maintenance of special conditions of pressure. All these methods for the technical production of silver alcosols are however not practical.

The observation has now been made that a silver alcosol can be obtained in a surprisingly simple manner when oxide of silver is warmed in the presence of hydrogen with a slightly acid alcoholic solution of an organic protective body soluble in alcohol. The oxide of silver is advantageously suspended in the alcoholic solution and hydrogen gas introduced. Thus the oxide passes gradually into solution. To work rapidly an excess of oxide of silver can be employed and the operation is brought to an end at the desired concentration. The unchanged oxide separated from the liquid can be utilized again just as it is. The alcoholic silver solutions obtained are stable.

By evaporating the alcohol or by precipitation with ether the alcosol can be brought to a solid form. There are thus formed dark glossy laminæ or brown, loose, light powder. The solid alcosol is again soluble in absolute alcohol; should the organic protective body employed have been soluble in water then the solid alcosol will be at the same time a hydrosol. These solutions give a neutral reaction. The alcosols are adapted for therapeutic and photographic purposes.

Example I.

Some dry oxide of silver free from carbonate is added to a slightly acid solution of resin in absolute alcohol and hydrogen gas is passed through at about 65° C. in such manner that the oxide is stirred up; a deep red brown liquid is formed by the oxide passing into solution and forming a silver alcosol.

Example II.

A solution of 20 parts of technically pure sodium salt of gall acids ("Fel tauri depuratum siccum, extractum fellis bovis") in 100 parts 98% ethyl-alcohol is slightly acidulated with acetic acid and warmed to 60° C.; three parts of oxide of silver are then gradually added while stirring well and a weak stream of hydrogen is passed through until all the oxide has passed into solution. The solid alcosol is obtained by precipitation with 200 parts of ether.

Example III.

One kilogram of sodium salt of glycocholic acid is dissolved in 6 litres of 98% ethyl-alcohol and 4 c. c. of nitric acid (density 1.4) are added; oxide which has been precipitated from 300 grammes of nitrate of silver and washed with alcohol is then added and hydrogen is passed through during a period of four hours with a continual stirring the temperature being maintained at about 60° C. After being left standing for 12 hours the liquid is separated from the sediment at the bottom by decantation. After evaporation of the alcohol there remains a dry residue containing about 15% of silver, which said residue is soluble in water, pure ethyl-alcohol, propyl-alcohol, normal - butyl - alcohol, iso-butyl alcohol, amyl-alcohol and so on. as well as in mixtures of these alcohols.

It will be understood that the invention is not restricted to the temperatures stated in the above examples said examples being given only as illustrations of a reaction which can be successfully carried out at various temperatures and with various degrees of concentration.

What I claim and desire to secure by Letters Patent is:—

1. Process for the production of organic silver alcosols consisting in warming oxide of silver in the presence of hydrogen with a slightly acid solution of an organic protective body in alcohol, and in separating the alcosol obtained.

2. Process for the production of organic silver alcosols consisting in warming oxide of silver in the presence of hydrogen, with a slightly acid solution of an organic protective body in alcohol, and in separating the alcosol produced by decanting the alcoholic solution and by evaporating the alcohol.

3. Process for the production of organic silver alcosols consisting in adding oxide of silver with energetic stirring to a solution of the sodium salt of gall acids in ethyl alcohol slightly acidulated with acetic acid, passing hydrogen through, and separating the alcosol produced by decanting the alcoholic solution and by evaporating the alcohol.

4. Process for the production of organic silver alcosols consisting in warming to 60° C. a solution of 20 parts of the sodium salt of gall acids in 100 parts 98% ethyl-alcohol slightly acidulated with acetic acid, adding three parts of oxide of silver with good stirring, passing through a weak stream of hydrogen and separating the alcosol produced by decanting the alcoholic solution and by evaporating the alcohol.

5. The process of producing organic silver alcosols which consists in stirring together oxide of silver and a solution of the sodium salt of gall acids in ethyl alcohol slightly acidulated with acetic acid, and passing hydrogen therethrough.

In testimony whereof I have signed my name to this specification.

JEAN ALTWEGG.